July 14, 1964 C. H. SCOTT 3,140,996
SEDIMENT CONVEYING APPARATUS FOR SETTLING TANKS
Filed July 1, 1960 3 Sheets-Sheet 1

INVENTOR
Charles H. Scott
BY Theodore M. Jablon
ATTORNEY

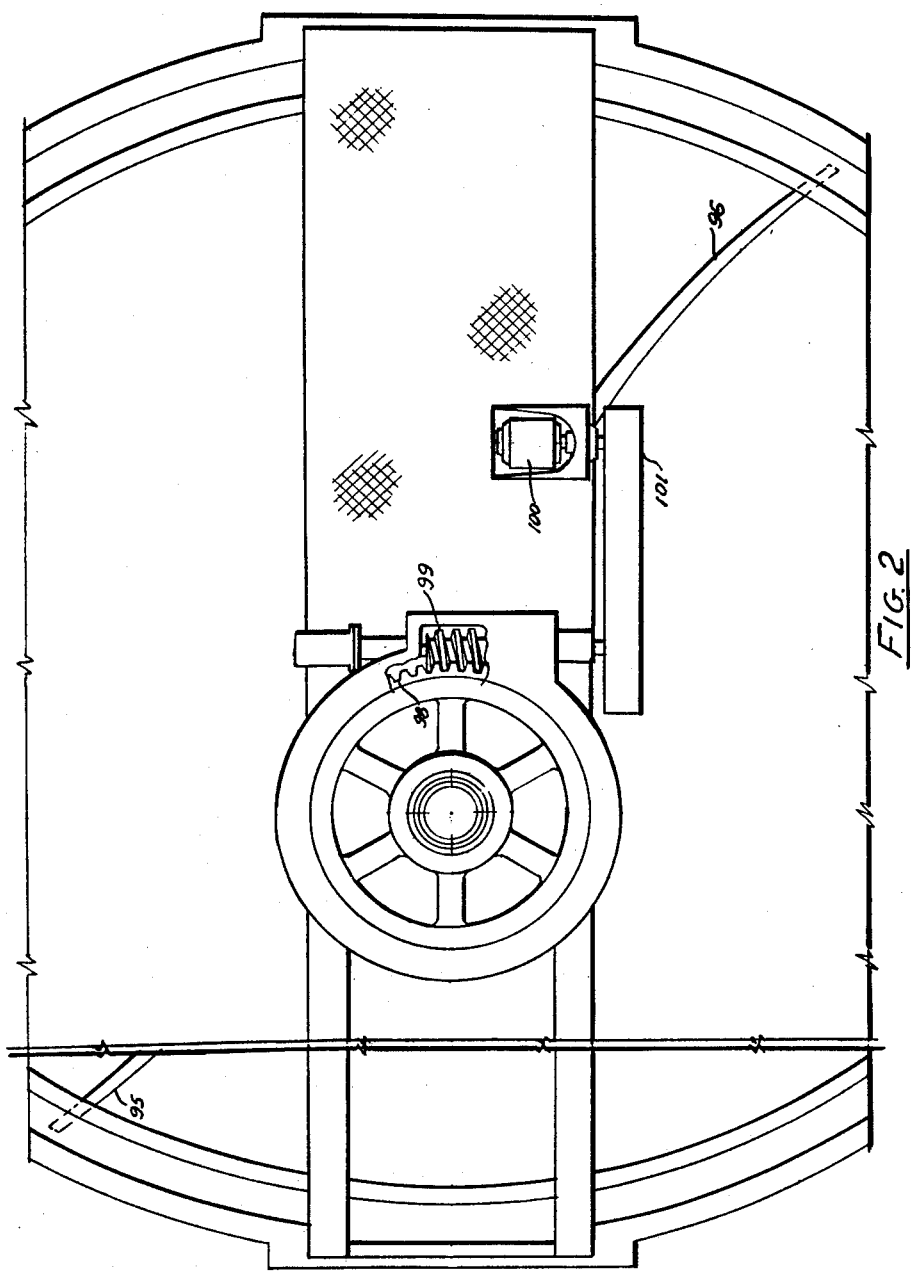

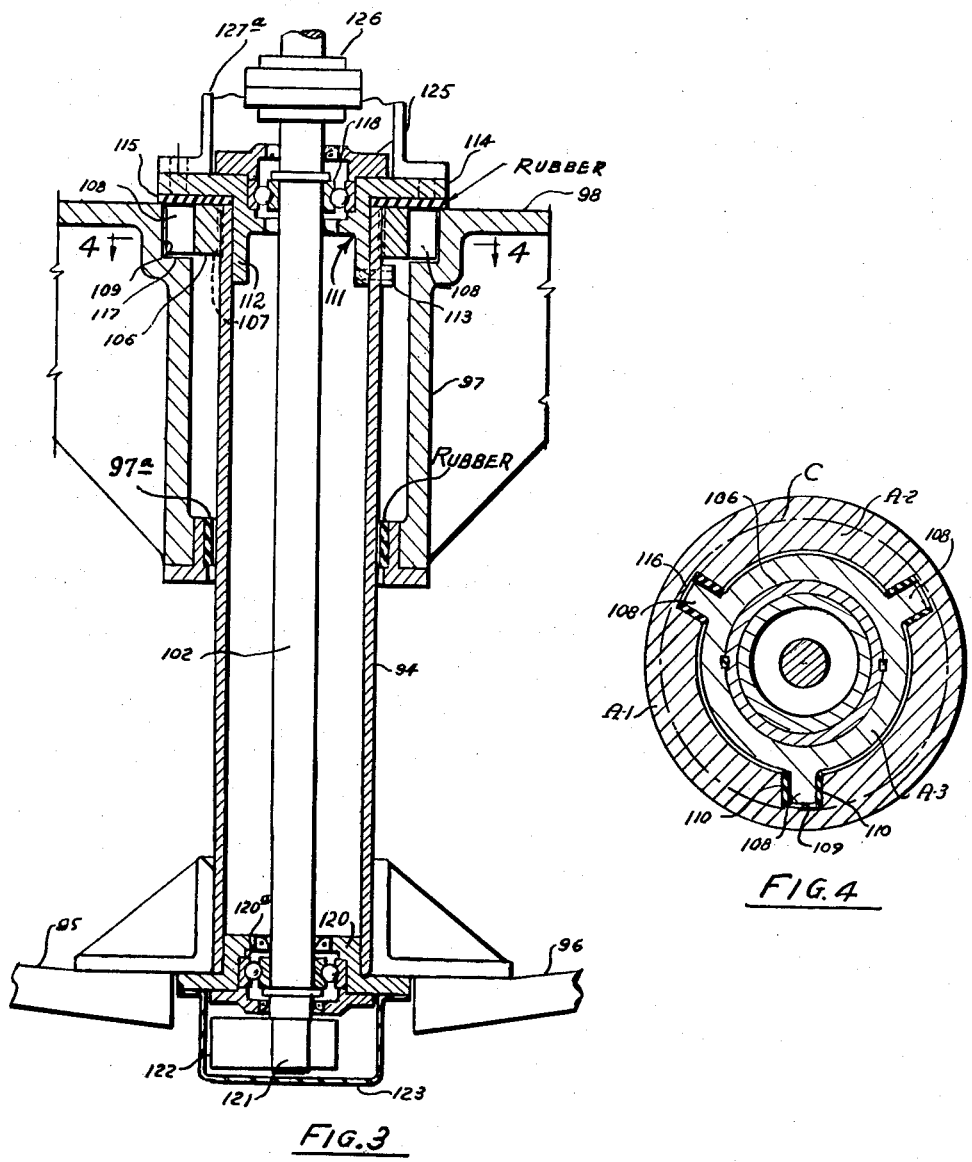

United States Patent Office 3,140,996
Patented July 14, 1964

3,140,996
SEDIMENT CONVEYING APPARATUS FOR SETTLING TANKS
Charles H. Scott, South Norwalk, Conn., assignor to Dorr-Oliver Incorporated, Stamford, Conn., a corporation of Delaware
Filed July 1, 1960, Ser. No. 40,245
4 Claims. (Cl. 210—528)

This invention relates to sediment raking apparatus in settling tanks for conveying the sediment to an outlet means.

The invention may be advantageously applied to, and embodied in the kind of raking apparatus wherein rotation of the rake means conveys the sediment to the outlet means, and the invention is therefore herein thus illustrated and exemplified.

Difficulties have been experienced in the operation of sediment raking apparatus, especially with the heavy or dense sludges that tend to pack on the bottom and make it difficult, if not impossible to restart the mechanism after it has been stopped, or to maintain its normal operation when sediment has accumulated.

Sludges presenting such difficulties may be in the nature of chemical precipitation sludges, or they may be natural sludges, for instance the sediment from ore slurries or the like, and many others. The sludges may be of the kind having more or less thixotropic characteristics, which must be kept in constant motion and thus sufficiently fluidized, to prevent packing and solidification.

It is among the objects of this invention to provide improved sediment raking apparatus, for facilitating and expediting the conveyance of the sediment material to the outlet means. More particularly, it is among the objects of this invention to overcome the foregoing sediment handling difficulties in a simple and effective manner, which avoids the need to provide extra heavy mechanism as insurance against breakage under overload, extra reserve or excess driving power, and the need to rely only upon the time consuming operation of rake lifting devices for relieving the rake means when thus burdened.

According to the invention, the above objects are attainable through a manner of operation which combines progressive motion of the rake means or raking blades with short repetitive motions imparted to the rake means substantially in a horizontal plane, thereby providing localized puddling and fluidizing effects upon the sediment, either while the progressive motion of the rake means is at rest or else simultaneously therewith. These localized puddling motions, if applied before restarting the progressive or rotational motion of the rake structure, will cause the rake means proper to free themselves sufficiently for the progressive motion to be resumed. This avoids excessive strain upon the parts, excessive power requirements, and generally facilitates and expedites the conveyance of the sediment to the outlet means.

When associated with the rotary type of structure, the invention may be embodied in a mechanism which imparts to the rake structure additional short stroke or localized puddling movements which may be epi-cycloidal with respect to the rotation of the raking means, for initiating and/or maintaining fluidization of the sediment.

According to this invention as herein exemplified, the compound movement imparted to the rake structure is attained by having the rake structure supported from a main drive gear rotated about a fixed vertical main reference axis, while the center of rotation of the structure itself is caused to perform movement about this fixed axis in repetitive cyclic paths. More particularly, the rake structure is suspended from the gear for limited swinging movement in all directions, and impulse producing means such as an unbalanced shaft, are provided for imparting and maintaining the cyclic movements of said center of rotation.

Other features and advantages will hereinafter appear.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

FIG. 2 is a top view taken on line 2—2 in FIG. 1;

FIG. 3 is an enlarged detail sectional view taken on line 3—3 in FIG. 1, showing more clearly the arrangement of the impulse imparting means;

FIG. 4 is a cross-sectional view taken on line 4—4 in FIG. 3.

Figure 1:
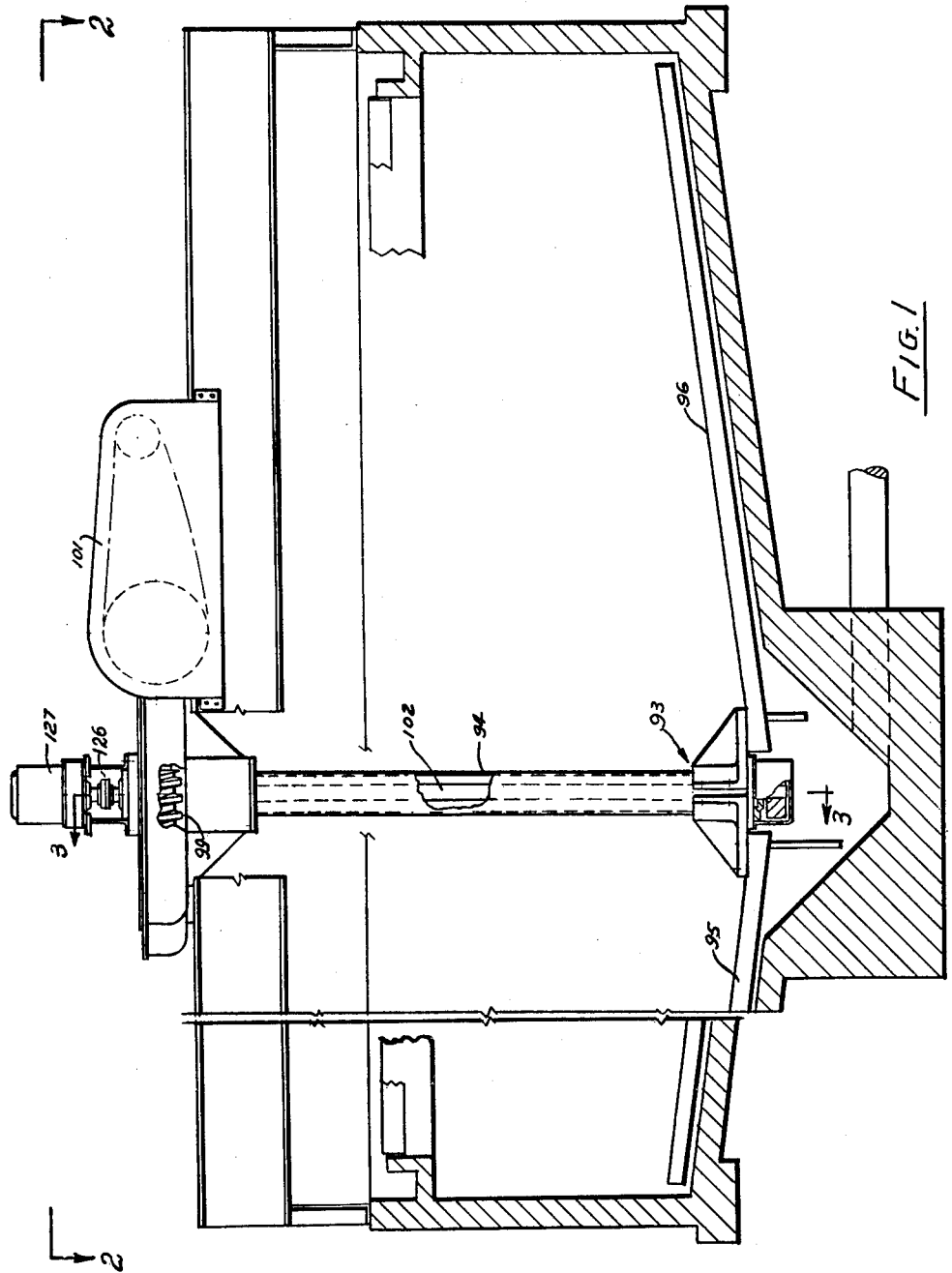
FIG. 1 is a vertical sectional view of a settling tank, with rake drive mechanism according to the invention, embodying impulse imparting means producing horizontal cyclic bodily movements to the rake structure during its rotation.

As exemplified in FIGS. 1 to 4, the short-stroke puddling movements of the rake structure are generated by impulses produced more or less in the nature of vibrations imparted to the rake structure or to the raking means substantially in a horizontal plane. With that concept, for example vibrations with frequencies of 800 to 1000 cycles per minute may be applied to the rake structure mounted, for example in a 30 foot diameter tank, while the main drive gear and the rake structure may rotate slowly at the rate of about $\frac{1}{10}$ r.p.m.

In a preferred embodiment according to FIGS. 1 to 4, the rake structure 93 comprises a tubular shaft member 94 carrying the sediment-engaging rake means proper which, as in the preceding embodiments, may be in a form of volute-shaped arms 95 and 96. The tubular shaft 94 is suspended in the hub portion 97 of the main drive gear 98 which in this embodiment is part of a worm drive unit wherein a worm member 99 drives the gear, the worm member itself being driven as by a main drive motor 100 through any suitable power transmitting drive elements such as are indicated at 101. Preferably, the tubular shaft is wide enough at least to accommodate therein the mountings or bearings for the shaft 102 of a vibrator mechanism which is independently rotated, which mechanism will be furthermore described below, its purpose being to impart the aforementioned vibration frequencies to the rake structure. The worm-drive unit with the drive motor are stationary, being mounted as on a pair of parallel supporting beams spanning the top of a settling tank, which tank with the beams is similar to the ones shown in the preceding embodiments.

Referring more particularly to the detail showing in FIG. 3, the tubular shaft member 94 is suspended from the main drive gear through rubber mountings which permit the shaft to perform very small angular movements cyclically relative to the main drive gear whereby the raking means or arms themselves are vibrated substantially in a horizontal plane. These movements are maintainable at a suitable frequency by means of an impulse vibrating device to be described below.

The tubular shaft 94 receives its driving torque from the main drive gear through torque ring 106 which is keyed as at 107 to the top end of the tubular shaft, and formed with a plurality of radial lugs or projections 108 (see also FIG. 4) lodging in corresponding recesses 109 of the surrounding hub portion of the main drive gear. Preferably, for the purpose of attaining uniformly balanced torque transmission from the drive gear to the tubular shaft, three such radial projections are provided spaced 120° apart, each such projection having lateral clearance with the adjoining walls of the recesses. Rubber pads or cushions 110 are provided at each side of each projection to fill the respective lateral clearances.

A flanged terminal member 111 is detachably fastened to the top end portion of the tubular shaft, having a cylindrical body portion 112 fitted into the top end portion of the tube, and detachably connected thereto, as indicated by a fastening screw 113, and having a flange 114 extending from the outer end of this body portion and of a diameter large enough to partially overlie the main drive gear. This annular overlap of the parts is indicated by the dot-and-dash circle "C" shown in the cross-sectional view of FIG. 4, indicating that the flange extends just slightly beyond the projections 108, thus providing areas $A_1$, $A_2$, $A_3$ of overlap (see also FIG. 4) between the respective recesses 109 in the main drive gear. These areas sustain the weight of the rake structure through a flat ring 115 of resilient material such as rubber interposed between the flange 114 and the torque ring 106.

It will be noted that the projections 108 of the torque ring each have a peripheral end clearance 116 as well as a bottom clearance 117 enabling the aforementioned slight annular displacements of the tubular shaft relative to the main drive gear when such displacements or oscillations are induced for instance by means of the aforementioned vibrating device now to be furthermore described.

In this vibrating device, a lower terminal member 120 is fixed to the lower end of the tubular shaft containing a lower ball bearing 120a. The lower projecting end portion 121 of the vibrator shaft has fixed thereto an unbalanced weight member 122, with a hood 123 fixed sealingly to the underside of the terminal member 120 in order to provide a sealed chamber for the weight 122. Thus, all the space within the tubular shaft member is sealed off against the liquid body that surrounds it in the tank.

The upper ball bearing 118 is a combined transverse and thrust ball bearing adequate to absorb the weight of the vibrator shaft and its appurtenances, and held in place in the upper terminal member 111 by means of a cover member 125. The upward extension of the vibrator shaft has a coupling 126 connecting it to the shaft of a vertical auxiliary drive motor 127 mounted upon and carried by the upper flanged terminal member 111, as indicated by supporting bracket member 127a. It will be seen that with the resilient mounting or rubber pads above described, the rake structure with the vibrating device including the motor 127 constitute a unitary assembly that can be vibrated in a cyclic path at suitable frequencies as long as the unbalanced weight member 122 is rotated by the motor 127, to generate the aforementioned puddling effects upon the sediment in the tank, even while the rake structure itself is rotated slowly by the main drive motor 100. Here again, power to the auxiliary motor 127 may be supplied as by a suitable sliding contact brush device which need here not be shown.

In a preferred embodiment herein illustrated where the invention is applied to a tank of a diameter suited for having the construction of the drive mechanism and of the raking means supported from the top, it is advantageous to employ bottom raking elements in the form of blades 95 and 96 shaped along the line of logarithmic spirals. As shown, these blades are of slender stilleto-shaped configuration and relatively shallow curvature particularly effective in loosening and re-liquifying packed sediment in the operation of this invention.

Furthermore, the puddling action attainable by the drive mechanism of this invention, is in particular effective and useful in the area of the sump providing a central bottom discharge for the sediment or sludge where otherwise congestion or "rat-holing" might occur. Puddling pins extending from the lower end of the rake structure downwardly into the sump will keep the material fluid and homogenized.

I claim:

1. Sediment raking apparatus for a settling tank having a bottom and sediment outlet means, comprising a rake structure in said tank having a vertical portion and sediment engaging bladed means carried thereby, rotatable for progressively moving sediment on the tank bottom to said outlet means; stationary support means; a main drive gear mounted on said stationary support means for rotation about a vertical axis; means for supporting said vertical portion from said gear for limited swinging movement in all directions relative to the axis of rotation of said gear; main drive means for rotating said gear; torque transmission means effective between said gear and said vertical portion for imparting rotation to said rake structure by the rotation of said gear; impulse producing means carried by said rake structure and operable for imparting to the rotary center of said sediment engaging means, movements relative to said gear along repetitive cyclic paths about the axis of rotation of said gear, said impulse producing means comprising an unbalanced rotary member mounted for rotation on said rake structure substantially coaxial therewith; and independent auxiliary drive means for rotating said unbalanced member, supported by said gear and effective when operated during the rotation of said gear to loosen the sediment and to facilitate the conveyance thereof by said bladed means to said outlet means.

2. Sediment raking apparatus for a settling tank having a bottom and sediment outlet means, comprising a rake structure in said tank having a vertical tubular shaft and sediment engaging bladed means carried thereby, rotatable for progressively moving sediment to said outlet means; stationary support means; a main drive gear mounted on said stationary support means for rotation about a vertical axis; means for supporting said shaft from said gear for limited swinging movement in all directions about the axis of rotation of said gear; main drive means for rotating said gear; torque transmission means effective between said gear and said shaft for imparting rotation to said rake structure by the rotation of said gear; impulse producing means carried by said rake structure and operable for imparting to the rotary center of said sediment engaging means movements relative to said gear along repetitive cyclic paths about the axis of rotation of said gear, said impulse producing means comprising an unbalanced shaft mounted for rotation in said tubular shaft substantially coaxial therewith; and independent auxiliary drive means for rotating said shaft, supported by said gear and effective when operated during the rotation of said gear to loosen the sediment and to facilitate the conveyance thereof by said bladed means to said outlet means.

3. Sediment raking apparatus according to claim 2, wherein said auxiliary drive means are mounted upon and carried by the top end of said tubular shaft, and which tubular shaft in turn is supported by said gear.

4. Sediment raking apparatus for a settling tank having a bottom and sediment outlet means, comprising a rake structure in said tank having a vertical tubular shaft and sediment engaging bladed means caried thereby, a rotatable for progressively moving sediment to said outlet means; stationary support means; a main drive gear mounted on said stationary support means for rotation about a vertical axis; means for supporting said shaft from said gear for limited swinging movement in all directions about the axis of rotation of said gear; main drive means for rotating said gear, torque transmission means effective between said gear and said hollow shaft for imparting rotation to said rake structure, comprising a hub portion on said gear formed with three internal radial recesses substantially equally spaced one from another, a torque ring member fixed to and coaxially surrounding the upper end of the said hollow shaft and having three outward radial projections lodging with lateral clearances in respective recesses of said hub portion with filler means of resilient cushioning material provided in said clearances on each side of the respective projections; an upper terminal member fixed to the tubular shaft and formed with a flange portion overlying said torque ring member and spaced therefrom by a horizontally extending annular gap with additional filler means of resilient cushioning material provided in said gap supporting said rake structure; impulse producing means carried by said rake structure and operable for imparting to the rotary center of said sediment engaging means movements relative to said gear along repetitive cyclic paths about said axis of rotation of the gear, said impulse producing means comprising an unbalanced shaft mounted for rotation in said tubular shaft substantially coaxial therewith; and independent auxiliary drive means for rotating said unbalanced shaft, supported by said gear and effective when operated during the rotation of said gear to loosen the sediment and to facilitate the conveyance thereof by said bladed means to said outlet means.

References Cited in the file of this patent
UNITED STATES PATENTS

| | | |
|---|---|---|
| 2,067,583 | Stark | Jan. 12, 1937 |
| 2,126,884 | Hardinge | Aug. 16, 1938 |
| 2,262,412 | Weinig | Nov. 11, 1941 |
| 2,291,836 | Scott | Aug. 4, 1942 |
| 2,588,115 | Hines | Mar. 4, 1952 |
| 2,717,147 | Fejmert et al. | Sept. 6, 1955 |
| 2,988,249 | Wahl | June 13, 1961 |